United States Patent [19]

Kelm

[11] Patent Number: 4,730,525
[45] Date of Patent: Mar. 15, 1988

[54] INDEXABLE CUTTING TOOL

[75] Inventor: Walter Kelm, Mt. Clemens, Mich.

[73] Assignee: General Electric Company, Detroit, Mich.

[21] Appl. No.: 858,346

[22] Filed: May 1, 1986

[51] Int. Cl.⁴ .................. B23B 27/16; B23B 29/32
[52] U.S. Cl. .................... 82/36 A; 29/39;
 29/48.5 R; 29/48.5 A; 74/813 R; 74/813 L;
 407/90; 407/104; 407/106; 407/112; 408/35
[58] Field of Search ............. 82/36 A; 407/103, 104,
 407/106, 112, 81, 82, 84, 90, 99; 408/35; 74/813
 R, 813 L, 816, 817; 29/39, 48.5 R, 48.5 A

[56] References Cited

U.S. PATENT DOCUMENTS

| 1,396,180 | 11/1921 | Fors . | |
|---|---|---|---|
| 3,137,917 | 6/1964 | Dowd . | |
| 3,270,396 | 9/1966 | Williams . | |
| 3,534,457 | 10/1970 | Mueller . | |
| 3,660,879 | 5/1972 | Erkfritz . | |
| 3,981,607 | 9/1976 | Jorgensen | 408/713 |
| 4,024,777 | 5/1977 | Fogarty | 408/35 |
| 4,408,507 | 10/1983 | Szewczyk | 82/36 A |
| 4,414,733 | 11/1983 | Vanotik et al. | 82/36 A |
| 4,541,165 | 9/1985 | Sawai et al. | 82/36 A |
| 4,552,046 | 11/1985 | Dombrowski et al. | 82/36 A |

FOREIGN PATENT DOCUMENTS

| 1136185 | 9/1962 | Fed. Rep. of Germany . | |
|---|---|---|---|
| 37989 | 4/1978 | Japan | 82/36 A |
| 20490 | 2/1979 | Japan | 82/36 A |

Primary Examiner—Nicholas P. Godici
Assistant Examiner—Jerry Kearns
Attorney, Agent, or Firm—Hedman, Gibson, Costigan & Hoare

[57] ABSTRACT

In accordance with the present invention, there is provided a cutting tool having a cutting tool insert which is automatically rotationally indexable. The cutting tool includes a shank and an indexable cutting tool insert rotatably connected to the shank. The insert includes a plurality of cutting edges and side surfaces therebetween. The cutting tool is also provided with an indexing device, lock pin, cam plate and eccentric cam pin. The indexing device comprises a sliding key and a pair of spring metal legs attached thereto for engaging a serrated portion of the lock pin to which the cutting tool insert is attached. The indexing device is effective for indexing the insert on the lock pin upon rotation of the cam pin which effects a lateral movement of the cam plate along the longitudinal axis of the shank whereby the cam plate engages the sliding key causing it to also move laterally to engage the indexing legs on the lock pin resulting in rotation of the lock pin and the cutting insert attached thereto.

18 Claims, 18 Drawing Figures

INDEXABLE CUTTING TOOL

BACKGROUND OF THE INVENTION

This invention relates generally to a tool holder and more particularly to an adjustable tool holder for securing and indexing cutting inserts in a pocket of the cutting tool.

Cutting tools used in metal cutting machines such as lathes, drills, milling machines and the like, are frequently formed with a removable and replaceable cutting tool insert made of a hardened material such as high speed steel, carbide or ceramic, mounted upon the tool holder. The inserts are generally formed having rectangular, triangular, diamond or circular cross-sectional configurations Such inserts are formed with a number of cutting edges so that when one edge becomes worn the insert may be rotationally indexed to present a new cutting edge. When all the edges of a insert are worn, the insert is replaced.

Conventionally, such indexing of a cutting tool insert has been performed either manually or by relatively complex indexing means. Typically when a cutting edge of an insert has been used or worn the machining operation is temporarily suspended, the insert is loosened on its holder, then turned to present a new cutting edge to the work piece, accurately positioned, and then retightened on the holder Indexing of a cutting tool insert, therefore results in an undesireable loss of operating time.

Furthermore, with the advent of computer aided manufacturing systems, improved means for indexing tool inserts with increased speed while maintaining accuracy of position is desirable.

One attempt at providing an indexable cutting tool is disclosed in U.S. Pat. No. 4,552,046 (Dombrowski et al). In this patent a cutting tool insert is automatically indexed by means of a shaft and slideable member attached to the tool holder. The slideable member engages a point of the insert and pushes it in a rotational manner until the next insert point is in the cutting position. The insert is locked in position using one surface of the insert against the sliding member. This device, while providing for automatic indexing of the insert provides only one locking surface for the insert thereby making it susceptible to loosening during operation.

Thus, there is a need for a cutting tool having an insert which may be automatically rotationally indexed while providing an improved securing means for the insert to prevent both loosening and damage to the work piece during operation.

SUMMARY OF THE INVENTION

In accordance with the present invention, there is provided a cutting tool having a cutting tool insert which is automatically rotationally indexable. The cutting tool includes a shank and an indexable cutting tool insert rotatably connected to the shank. The insert includes a plurality of cutting edges and side surfaces therebetween.

The cutting tool is also provided with an indexing means, lock pin, cam plate and eccentric cam pin.

The indexing means comprises a sliding key and a pair of spring metal legs attached thereto for engaging a serrated portion of the lock pin to which the cutting tool insert is attached.

The indexing means is effective for indexing the insert on the lock pin upon rotation of the cam pin which effects a lateral movement of the cam plate along the longitudinal axis of the shank whereby the cam plate engages the sliding key causing it to also move laterally to engage the indexing legs on the lock pin resulting in rotation of the lock pin and the cutting insert attached thereto.

In a preferred embodiment, the cutting tool comprises a shank with a cavity provided in the top and at one end for receiving the sliding key. Extending through the shank in a direction perpendicular to the longitudinal axis of the shank is a first bore for receiving the lock pin therethrough, and a second bore for receiving the cam pin therethrough. The lock pin is adapted to extend through the bore so that the serrated portion of the lock pin is positioned in the cavity of the shank. The cam plate is positioned on top of the shank above the sliding key and is provided with a pocket at one end for engaging and locking the cutting tool insert. An elongated longitudinal bore is provided in the cam plate to allow the cam pin to pass through. The cam plate is further provided with a lateral slot having a breadth equal to the diameter of the cam pin head.

The cam pin is positioned in the elongated bore of the cam plate and through the second bore of the shank in a position abutting one end of the sliding key. The cam pin head is nestled in the lateral slot of the cam plate and is provided with a tool recess for rotating the cam pin. The cam pin is secured in this position by a fastening means at the base of the shank.

The cutting tool which utilizes the present invention, can be provided with a number of different types of cutting tool inserts and corresponding pockets incorporated in the cam plate for engaging and securing the cutting tool insert.

The cutting tool insert includes a central aperture and is positioned on the seat of the lock pin. The cutting tool insert is positioned in the pocket of the cam plate with two of its side surfaces adapted to be held against the walls of the pocket by the action of the cam pin. When it becomes necessary to change the cutting edge of the insert, i.e., index the insert, a tool is inserted in the cam pin head and the cam pin is rotated approximately 330°. The action of the cam pin head against the lateral slot of the cam plate results in a translation of the cam plate in a direction parallel to the longitudinal axis of the shank. In the first 180° of rotation of the cam pin the cam plate engages and translates the sliding key in the longitudinal direction away from the insert causing one indexing leg to engage the serrated portion of the lock pin thereby partially rotating the lock pin. As the cam pin continues to be rotated, the longitudinal translation of the cam plate is reversed causing the sliding key to also retract. Upon retraction, the second indexing finger engages the serrated portion of the lock pin to complete the necessary rotation of the cutting insert.

Further rotation of the cam pin causes the pocket of the cam plate to engage and secure the cutting tool insert.

BRIEF DESCRIPTION OF THE DRAWINGS AND DETAILED DESCRIPTION OF THE INVENTION

The following is a detailed description together with the accompanying drawings of an illustrative embodiment of the invention. It is to be understood that the invention is capable of modification and variation apparent to these skilled in the art within the spirit and scope of the invention.

Figure 1:
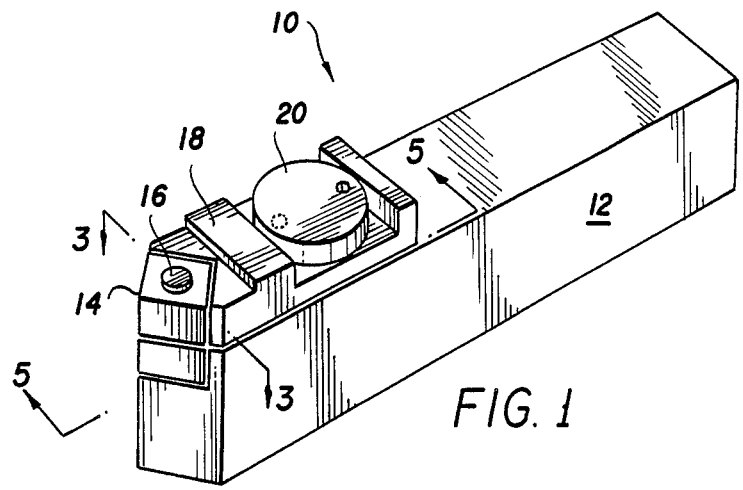
FIG. 1 is a perspective view employing a preferred embodiment of a cutting tool having means for automatically indexing a cutting tool insert according to the present invention.

Referring to the drawings and first to FIG. 1, these is shown a preferred embodiment of a completely assembled cutting tool 10 having an elongated shank or tool holder 12 which may be removably mounted in a cutting machine such as, for example, a lathe, drill or milling machine (not shown) The tool 10 also includes an exemplary indexable square cutting tool insert 14, rotatably mounted at one end of the shank 12 on a lock pin 16 and supported on a fixed seat 15. The insert 14 is conventional and may be employed in a number of shapes including square, triangular, diamond, round or any other peripheral shape. The insert 14 may be made of any conventional cutting tool materials such as, high speed steel, carbide, ceramic or other known compositions.

As shown in FIGS. 1 and 2, the cutting tool 10 of the present invention also includes means for indexing the insert including a sliding key 22 having means for rotating the lock pin 16, a cam plate 18 for engaging the sliding key 22 and locking the insert 14, and a cam pin 20 adapted to be rotated for moving the cam plate 18.

Figures 2A, 2B:
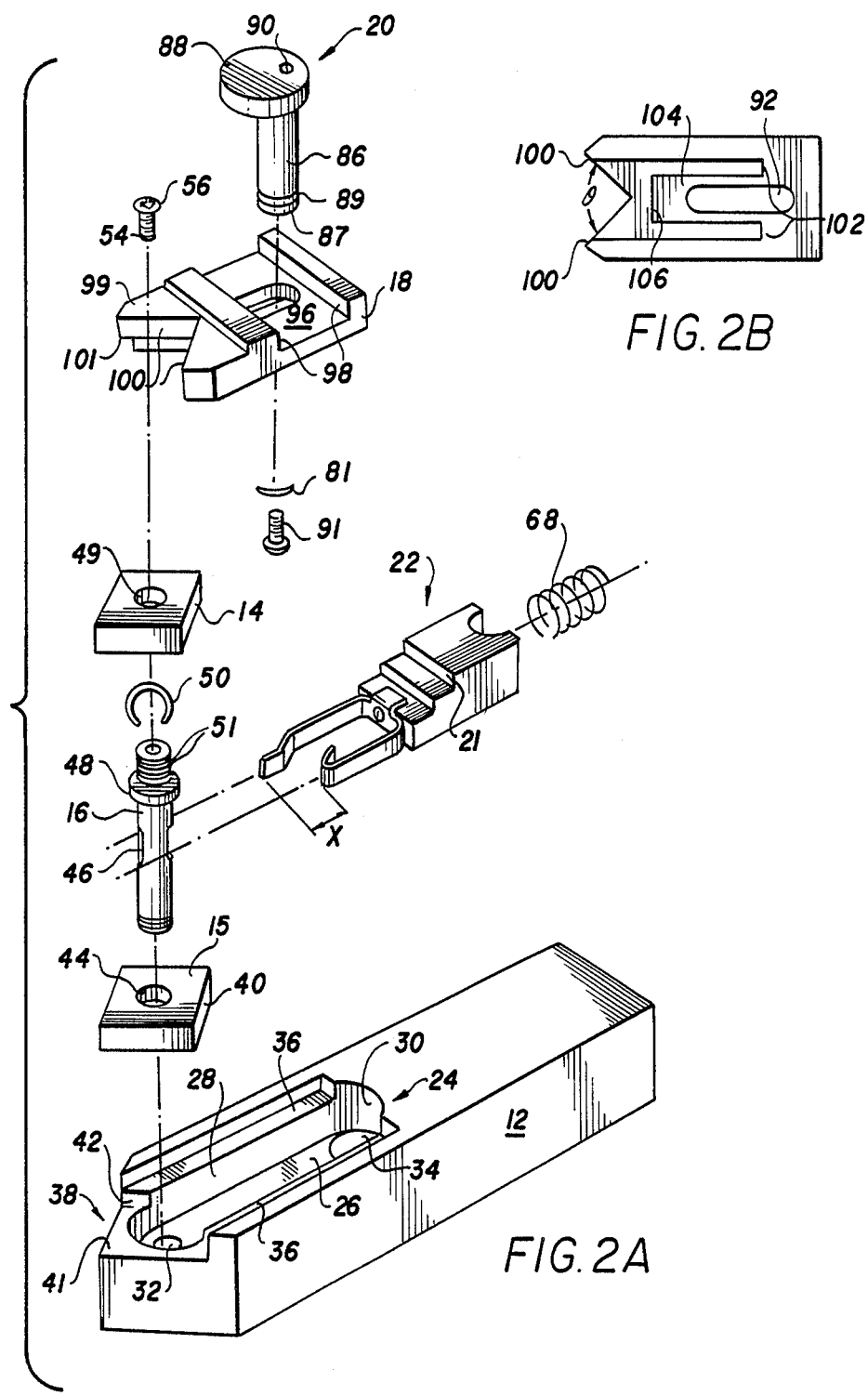
FIGS. 2A and 2B are an exploded perspective view of the cutting tool and indexing means assembly of FIG. 1 for automatically indexing a cutting tool insert according to the present invention.

Details of the cutting tool are more particularly illustrated in the exploded view of FIGS. 2A and 2B. As shown, the shank 12 includes a cavity 24 disposed generally along the longitudinal axis of the shank 12, having a bottom wall 26 and open at top for receiving the sliding key 22. The cavity 24, includes opposing walls 28 and substantially curved end walls 30 which are essentially vertical and are of a height sufficient to receive a substantial portion of the sliding key 22.

Disposed in the bottom wall 26 of the cavity 24 and vertically extending through the shank 12 are a first bore 32 for receiving the lock pin 16 and a second bore 34 for receiving the cam pin 20.

In the preferred embodiment of FIG. 2, the shank 12 also includes shoulders 36 for supporting the cam plate 18 which slides along the longitudinal axis of the shank 12. The head or cutting end of the shank 12 has a cut-out 38 adapted to receive the insert seat 15. Depending on the shape of the seat 15, the cut-out 38 is configured so that the side surfaces 40 of the seat may extend slightly beyond the periphery of the shank 12. Surfaces 41 and 42 of the cut-out 38 should be perfectly flat, within the usual acceptable tolerances, and extend perpendicular to each other. Two surfaces 40 of the seat 15 are held loosely against vertical surfaces 42 of the cut-out 38 by means of the lock pin 16 which extends through a central aperture 44 in the seat 15 and through the first bore 32 in the shank 12. The lock pin 16 may be rotatably secured to the base of the shank 12 by conventional means, e.g., diametrical groove and oval retaining clip.

Figure 3:
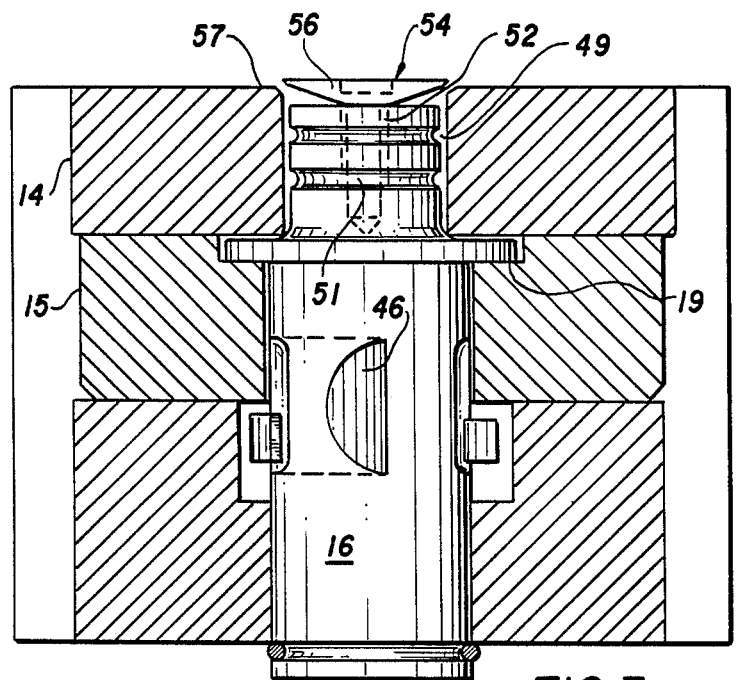
FIG. 3 is a sectional view, taken along lines 3—3 of FIG. 1.

Details of the lock pin 16 are more particularly illustrated in FIG. 3, which depicts the lock pin 16, seat 15 and insert 14 completely assembled in the tool holder 10. As shown, the lock pin 16 is generally cylindrical in shape and includes a serrated portion 46 about the circumference of the pin 16 and at the elevation of the cavity 24 of the shank 12 when the pin 16 is installed in the first bore 32. A shoulder 48 is provided about the periphery of the lock pin 16 for engaging the lock pin 16 on a circumferential lip 19 in the seat 15. The cutting insert 14 is positioned on the seat 15 by extending the lock pin 16 through a central aperture 49 in the insert. The insert 14 may be secured to the lock pin 16 by means of one or more oval clips 50 inserted about grooves 51 in the lock pin 16. The oval clips 50 have a major diameter sufficient to hug the inside diameter of the central aperture 49 of the insert 14, while the minor diameter of the clip 50 hugs the diameter of the groove 51. Alternatively, and preferably, the top of the lock pin 16 is formed with a threaded hole 52 extending along the axis of the lock pin 16 for receiving the shank of a screw 54 having a cylindrical head 56 with a diameter greater than that of the central aperture 49. With the insert 14 thus positioned on the lock pin 16, the screw 54 is threaded into hole 52 until the head 56 is seated against a countersink 57 in the insert 14, thereby securing the insert 14 against the shoulder 48 of pin 16.

Figure 4:
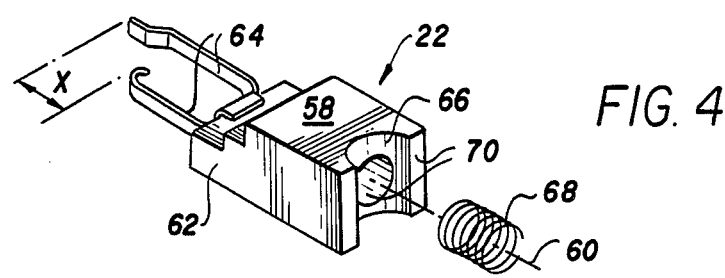
FIG. 4 is a perspective view of a sliding key for indexing the cutting tool insert according to a preferred embodiment of the present invention.

Referring to FIG. 4, the sliding key 22 in the preferred embodiment comprises a body 58 having a longitudinal axis 60, parallel side walls 62, a pair of spring indexable legs 64 affixed to one end of the key 22 and a vertical recess 66 at the other end of the key 22 having a radius of curvative effective for accomodating the cam pin 20 when the pin 20 is inserted through the second bore 34 of the shank 12. The sliding key 22 also includes a coil spring 68 which is positioned within a longitudinal bore 70 in the key 22.

The lateral breadth of the key 22 is of sufficient width so as to provide a close fit between the side walls 62 of the sliding key 22 and the side walls 28 of the cavity 24.

The indexable legs 64 extending from the body 58 of the sliding key 22 are substantially parallel and extend about the serrated portion 46 of the lock pin 16 in the cavity 24. The lengths of the two indexable legs 64 differ by an amount X which is a function of the shape of the insert 14, the number of teeth included in the serrated portion 46 and diameter of the lock pin 16.

Figure 5:
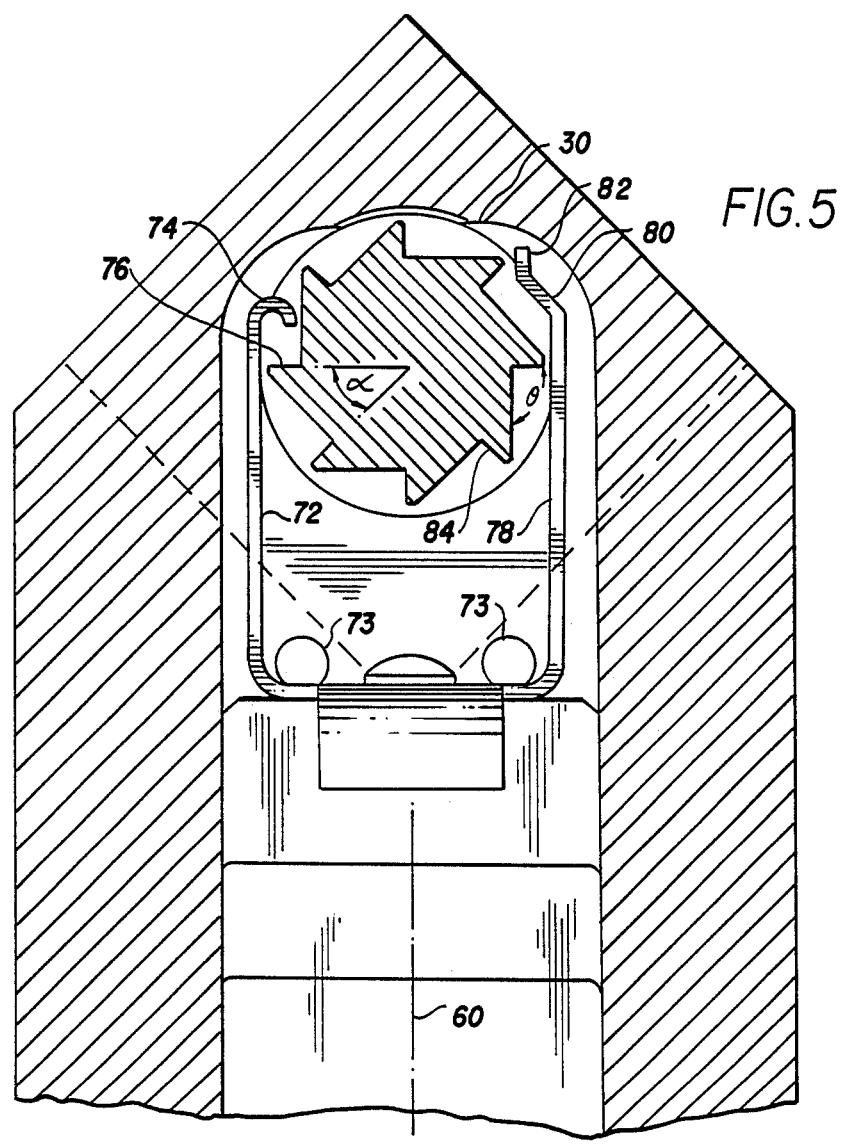
FIG. 5 is a sectional-elevational view, taken along lines 5—5 of FIG. 1.

Details of the cutting tool 10, cavity 24, sliding key 22 and lock pin 16 are more particularly illustrated in FIG. 5 which is a cross-sectional view through line 5—5 of FIG. 1. The shorter indexable leg 72 is provided with a hook like end 74 for engaging a first tooth 76 of the serrated portion of the lock pin 16 when the sliding key 22 is made to travel along its longitudinal axis 60 away from the lock pin 16 thereby effecting an angle a of rotation, e.g., 45° in the case of an insert having four cutting edges. The longer indexable leg 78 is jogged axially so as to provide an inclined ramp 80 to avoid interfering with the serratd portion 46 when key 22 slides away from the lock pin 16 and an engaging member 82 for engaging a second tooth 84 of the lock pin 16 when the key 16 is retracted toward the lock pin 16 thereby effecting the necessary rotation of the lock pin 16 with the insert 14 attached thereto.

A pair of stop pins 73 are provided in the shank 12 in front of the sliding key 22 to prevent the indexable legs 72 and 78 from contacting the end wall 30 of the cavity 24 during retraction of the sliding key 22.

As shown in FIG. 5, the included angle $\theta$ between the serrated teeth is generally 90° in the case of an eight tooth serrated section 46. The angle may be more or less depending on the shape of the insert 14, i.e., the number of surfaces and cutting edges provided on the insert 14. The angle $\theta$ may also be greater or less than 90° to improve the action between the teeth of the serrated portion 46 and the indexable legs 72 and 78, specifically engaging hook 74 and member 82.

Referring again to FIG. 2, the cam pin 20 comprises a cylindrical shaft 86 and a cylindrical head 88 eccentrically attached to the top of the shaft. A turning means 90 is disposed in the head 88 at a position in alignment with the longitudinal axis of the shaft 86. Upon passing the cam pin 20 through the cam plate 18 and the second bore 34 the cam pin 20 may be rotatably secured to the base of the shank 12 by means of an oval bowed spring retaining clip inserted in groove 89 or by any other conventional means.

One such means is the use of a plurality of inverted disc springs 89 affixed by a screw means 91 to a threaded hole 87 at the end of the cam pin 20. The assembly of disc springs are nested within a counterbore in the base of the shank 12. The disc springs not only retain the cam pin 20 in the shank 12 but are designed so as to create a drag between the cam pin head 88 and the cam plate 18 to prevent inadvertent insert loosening during the cutting operation.

The cam plate 18 in the preferred embodiment is illustrated in FIGS. 2A and 2B and comprises a central elongated slot 92 disposed substantially parallel to the longitudinal axis of the plate 18. The cam plate 18 also includes a lateral groove 96 defined by opposing side walls 98 against which the cam pin head 88 rotatably and slidingly engages. At one end of the cam plate 18, a pair of shoulders 100 are provided at an angle $\beta$ for engaging and securing the cutting tool insert 14 on the seat 15 of the cutting tool 10.

The shoulders 100 may be provided with a taper extending downwardly and inwardly from the top surface 99 of the cam plate 18 to the bottom edge 101 of the shoulders 100. The tapered shoulders 100 ensures that the cutting insert 14 will contact the seat 15 securely at the cutting edge.

Although the preferred embodiment of the present invention employs a pair of shoulders 100 to engage and secure the cutting tool insert 14, the invention is not limited to this embodiment. For instance, a single shoulder 100 may be feasible to secure the insert 14 provided adequate force is applied between the shoulder 100 and the insert 14.

The angle is provided to identically correspond to the angle formed by the side surfaces 17 of the cutting insert 14, i.e., for a square insert is 90°, for a triangular insert 2 is 60°, etc. In the embodiment illustrated in FIG. 2 a 90° angle is illustrated for a square insert. The included angle $\beta$ can be manufactured to tolerances of ±0 degrees to 2 degrees.

The cam plate 18 is also provided with opposing longitudinal tracks 102 which are of a width equal to the width of the shoulders 36 of the cavity 24 (FIG. 2B). When assembled the tracks 102 engage the shoulders 36 thereby allowing the cam plate 18 to translate only in a direction substantially parallel to the longitudinal axis of the shank 12. The cam plate 18 is further provided with a rib-like key 104 defined by the longitudinal tracks 102 and lateral wall 106 for engaging an upper shoulder 21 of the sliding key 22 during the indexing operation. When assembled, the cam pin 20 passes through the elongated slot 92 and through the second bore 34 at a position in the cavity 24 behind the sliding key 22. The spring 68 is disposed between the cam pin 20 and the recess 66 in the sliding key 22 and exerts a force on the sliding key 22 away from said cam pin 20. This is the compression force necessary to move the sliding key 22 to the left during the indexing of the insert 14.

The operation of the cutting tool indexing means according to the present invention is more particularly illustrated in the sequence of figures of FIG. 6 which depicts the actions of the internal indexing mechanism, i.e., sliding key 22 and lock pin 16 and the sequence of figures of FIG. 7 which depict the operation of the cam pin 20, cam plate 18 and a square insert 14 during the indexing steps.

Figure 6A:
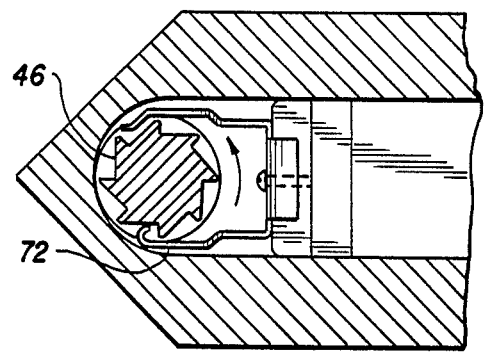
FIGS. 6A-6E illustrate a sequence of positions of the internal components of the cutting tool illustrated in FIG. 1 which occurs during indexing of the cutting tool insert.
Figure 6B:
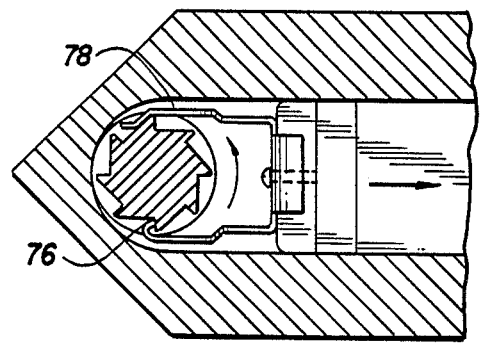
Figure 7A:
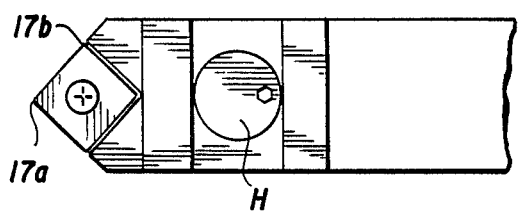
FIGS. 7A-7E illustrate a sequence of positions of the cutting tool illustrated in FIG. 1 which occurs during indexing of the cutting tool insert.
Figure 7B:
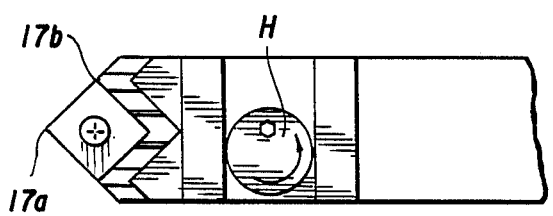

FIGS. 6A and 7A illustrate the sliding key 22 and the cam plate 18, respectively in their home positions. As seen in FIG. 6A the sliding key 22 does not engage the serated portion 46 of the lock pin 16 in the home position. Correspondingly, in FIG. 7A cam plate 18 locks and secures the insert 14 in a pocket formed between the shoulders 100. In this alignment insert edge 17a is in the cutting position and the high point of the cam head 88 indicated by H is substantially adjacent the cutting insert 14 when it becomes necessary to index the insert 14, i.e. to replace a worn cutting edge, an appropriate tool (not shown) is inserted into the turning means 90 of the cam pin 20 and a torque is applied to the cam pin 20. In FIG. 7B, the cam pin 20 has been rotated about 90° as indicated by the new position of high point H.

The cam pin 20 rotation results in a translation of the cam plate 18 to the right to allow clearance for rotation of the insert 14. Correspondingly, the first 90° rotation of the cam pin 18 results in a translation of the sliding key 22 to the position indicated by FIG. 6B. As seen, the hook like member 74 of the shorter indexable leg 72 is in position to engage a first tooth 76 of the serrated portion 46 of the lock pin 16.

Figure 6C:
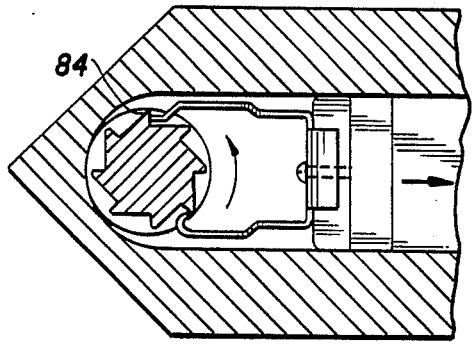
Figure 6D:
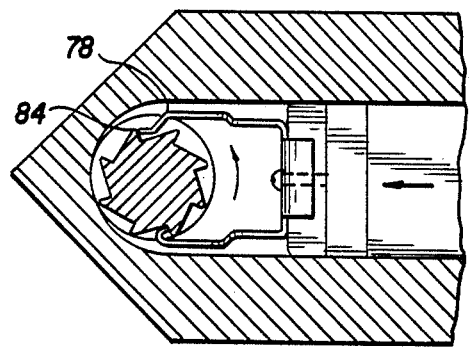
Figure 6E:
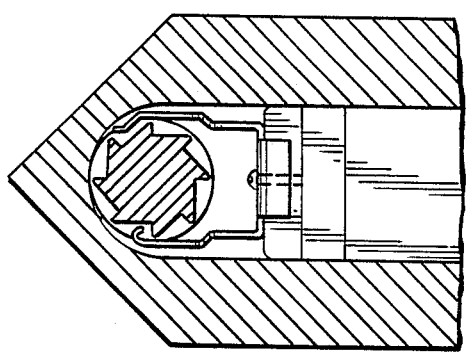
Figure 7C:
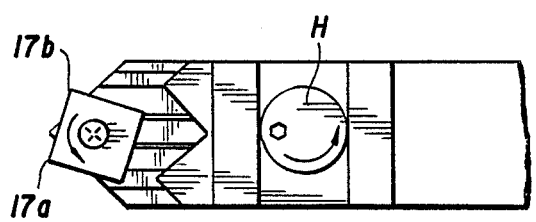

In FIG. 7C, the cam pin 20 has been rotated an additional 90° and the square insert 14 has been correspondingly rotated about 45° in the counterclockwise use direction. The insert rotation is accomplished by the continued axial translation of the sliding key 22 and the indexable leg 72 in engagement with the tooth 76. (FIG. 6C)

Figure 7D:
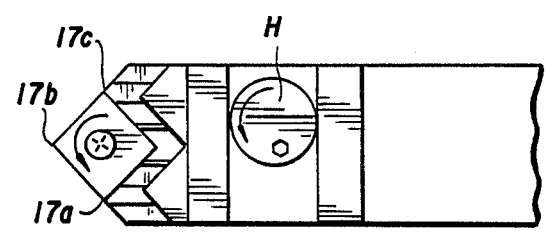

In FIG. 7D, the cam pin 20 has been rotated an additional 90° and the square insert 14 has been correspondingly rotated an additional 45° thereby effecting a total 90° rotation of the insert 14 to present a new cutting edge 17b at the cutting position in place of the worn cutting edge 17a. As seen, in FIG. 6D the direction of translation of the cam plate 18 has been reversed during the last 90° rotation of the cam in 20. Correspondingly, the translational direction of the sliding key 22 has also reversed by the action of spring 68 (not shown) resulting in the engagement of the longer indexable leg 78 with a second tooth 84 of the serrated portion 46 of the lock pin 16 thereby continuing the counterclockwise rotation of the lock pin 16 an additional 45°.

Figure 7E:
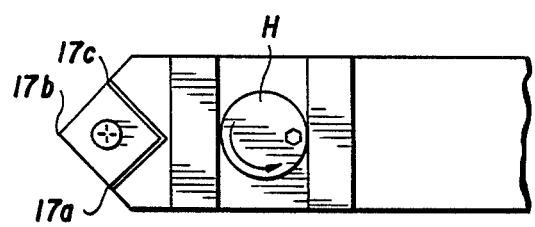

FIG. 7E illustrates the final rotation of the cam pin 20 to its home position where the shoulders 100 of the cam plate 18 lock and secure the cutting insert 14 with the new cutting edge 17b in the cutting position. Correspondingly, in FIG. 6E the sliding key 22 is translated to its home position to disengage the indexing legs 64 from the serrated portion 46 of the lock pin 16. The above described sequence of steps illustrated in FIGS. 6 and 7 can be repeated over and over again depending on the number of cutting edges on the insert 14.

The cam pin rotation must be reversed for each successive indexing step due to the fact that the cam pin 18 rotates only about 330° and not 360°. The 30° lost rotation is necessary to provide wedging force of the cam pin head 88 against the side walls 98 of the lateral groove 96 to lock the insert 14 between the shoulders 100.

An alternative means of indexing the insert 14 would be to rotate the cam pin 18 one-half turn in one direction, e.g. clockwise, followed by one-half turn in the opposite direction, e.g. counterclockwise. The two half-turns of the cam pin 18 results in a complete withdrawing and retracting step of the cam plate 18 and the sliding key 22 resulting in one complete indexing of the cutting insert 14.

Accordingly, it will appreciated that the cutting tool 10 including the indexing means acting directly on the insert 14 in accordance with this preferred embodiment of the present invention provides a relatively simple arrangement for indexing and locking the insert 14 which is readily adaptable to computer aided automatic indexing tools.

Figure 9:
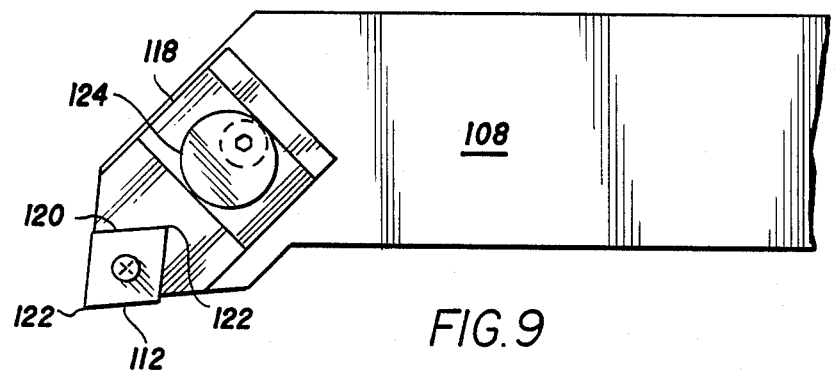
FIG. 9 illustrates a top view of an alternate embodiment of the present invention incorporating a diamond shape cutting tool insert.
Figure 8:
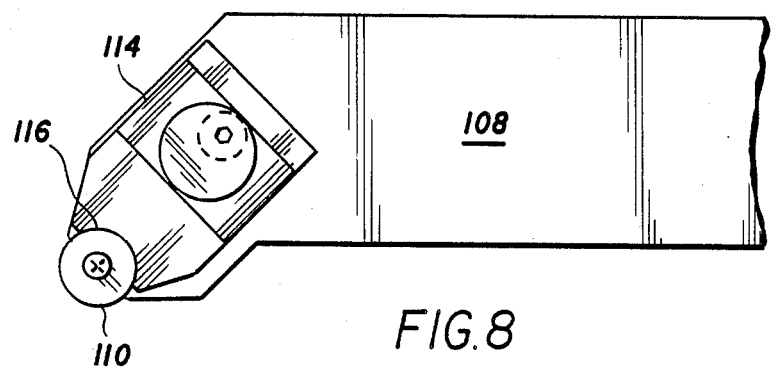
FIG. 8 illustrates a top view of an alternate embodiment of the present invention incorporating a round cutting tool insert.

Illustrated in FIGS. 8 and 9 are alternative embodiments of the present invention incorporated in a side cutting tool holder 108 including a round shaped cutting insert 110 and a diamond shaped cutting insert 112, respectively. In FIG. 8, the cam plate 114 includes rounded shoulders 116 to correspond to the radius of curvature of the cutting insert 110. Similarly, in FIG. 9, the cam plate 118 includes shoulder 120 having an included angle less than 90° to correspond to the acute angle of the diamond shaped insert 112. As evidenced from the cutting tool 108 of FIG. 9, the diamond shaped cutting insert 112 has four side surfaces but only two opposing cutting edges 122. Thus, to index the insert 112, two rotations of the cam pin 124 are necessary to effect a 180° rotation of the insert to present a new cutting edge in the cutting position.

Furthermore, the cam plates 114 and 118 in the embodiments of FIGS. 8 and 9 are translated in a direction which is no longer parallel to the longitudinal axis of the shank 108. The translation occurs in a plane coincidental with the plane bisecting the included angle of the shoulders and insert.

While there has been described herein what is considered to be the preferred embodiment of the the invention in its broadest aspects is not limited to the described embodiment and departures may be made therefrom within the scope of the accompanying claims without departing from the principles of the invention and without sacrificing its chief advantages. For example, although square, round and diamond inserts have been described, other multi-surface conventional type cutting inserts may be used such as triangular, or diamond tinlays. Variations of the indexing steps would also have to be employed depending on the number of cutting edges.

Another embodiment of the present invention may include a shaft connected to the cam plate in place of the cam pin. The reciprocating motion of the shaft will provide translation of the cam plate along the longitudinal axis of the shank which would be translated into a rotation of the lock pin through the sliding key.

What is claimed:

1. A cutting tool, comprising:
a shank having an elongated cavity at the cutting end;
an indexable insert having at least one side surface and a plurality of cutting edges;
means rotatably connecting said cutting insert to said shank including a lock pin slidably and rotatably extending through said shank having a ratcheting means about a portion of its length;
a seat adapted to said shank for supporting said insert;
means to secure said cutting insert on said seat in a cutting position comprising a plate moveably mounted to said shank having a pocket for engaging the side surface of the insert in the cutting position; and
means to index said cutting insert adapted to cooperate with said ratcheting means of said lock pin and with said moveable plate;
said indexing means being effective for rotating said cutting insert upon withdrawing said moveable plate from said insert which pushingly engages said indexing means in said cavity of said shank wherein said indexing means cooperates with said ratcheting means to effect a first partial rotation of said lock pin and said cutting insert attached thereto then retracting said moveable plate and said indexing means to again cooperate with said ratcheting means to effect a second partial rotation of said lock pin and said cutting insert, then further retracting said moveable plate to secure said cutting insert on the cutting position.

2. The cutting tool according to claim 1, wherein said elongated cavity has a bottom wall, opposing side walls and substantially curved end walls for receiving said indexing means, a first bore at one end of the cavity extending vertically through said shank for receiving said lock pin and a second bore at the other end of said cavity extending vertically through said shank for receiving a means for moving said moveable plate.

3. The cutting tool according to claim 1, wherein said seat includes a first central aperture therein for positioning around said lock pin and said insert includes a second central aperture therein for positioning around said lock pin.

4. The cutting tool according to claim 3, wherein said lock pin further includes a threaded bore adapted to cooperate with a screw means for securing said insert to said locking pin, wherein said second central aperture of said insert is positioned around said lock pin and said screw means is threaded into said threaded bore for securing said insert to said lock pin, whereby said insert rotates upon rotation of said lock pin.

5. The cutting tool according to claim 4, wherein said screw means includes a screw having a head which is recessible within a of said insert.

6. The cutting tool according to claim 1, wherein said ratcheting means of said lock pin includes a plurality of serrated teeth symmetrically spaced about the circumference of said lock pin, said teeth being oriented so as to include an angle between adjoining teeth.

7. The cutting tool according to claim 6, wherein said angle is about 90 degrees.

8. The cutting tool according to claim 1, wherein said indexing means comprises a sliding key having substantially parallel side walls, a longitudinal axis spaced therebetween, front and rear walls, a pair of indexable legs mounted to the front wall for engaging said ratcheting means of said lock pin, said key being slidably positioned within said cavity of said shank for allowing withdrawing and retracting in a direction substantially parallel to said longitudinal axis.

9. The cutting tool according to claim 8, further comprising a longitudinal bore extending into said rear wall of said sliding key for receiving a spring means for retracting said sliding key in said cavity of said shank.

10. The cutting tool according to claim 8, wherein said pair of indexable legs are substantially parallel and extend about the ratcheting means of said lock pin, the first of said pair of indexable legs having a length less than the length of the second of said pair of indexable legs by an amount X.

11. The cutting tool according to claim 2, wherein said pocket of said moveable plate includes shoulders disposed at an angle $\beta$ which corresponds to the angle formed by two surfaces of said insert, wherein said shoulders lock said insert in the cutting position when said moveable plate is retracted toward said insert.

12. The cutting tool according to claim 11, wherein said moveable plate further comprises a central longitudinal aperture and a lateral slot for receiving said means for moving said plate therebetween, wherein said moving means includes a cam pin and an eccentric head attached thereto, said head having a diameter equal to the breadth of said lateral slot so as to engage said slot upon rotation of said cam plate to effect translation of said moveable plate.

13. A cutting tool according to claim 1, wherein said indexing means is effective for positioning successive cutting edges into the cutting position upon successive withdrawings and retractions of said moveable plate and indexing means.

14. A cutting tool according to claim 1, wherein said cutting edges are symmetrically spaced aroung said insert.

15. A cutting tool according to claim 14, wherein said insert has a square shape.

16. A cutting tool according to claim 14, wherein said insert has a equilateral triangular shape.

17. A cutting tool according to claim 14, wherein said insert has a circular shape.

18. A cutting tool according to claim 14, wherein said insert has a diamond shape.

* * * * *